United States Patent [19]

Bonello

[11] Patent Number: 4,674,106
[45] Date of Patent: Jun. 16, 1987

[54] MECHANICAL COUNTER HAVING A DIGITAL DISPLAY

[75] Inventor: Philippe Bonello, Grand-Saconnex, Switzerland

[73] Assignee: Sarcem S.A., Meyrin, Switzerland

[21] Appl. No.: 769,068

[22] Filed: Aug. 26, 1985

[30] Foreign Application Priority Data

Sep. 26, 1984 [CH] Switzerland .................. 04609/84

[51] Int. Cl.⁴ .......................................... G06M 1/02
[52] U.S. Cl. ..................................... 377/82; 73/386; 235/103
[58] Field of Search ................. 377/82, 87; 73/386; 235/103

[56] References Cited

U.S. PATENT DOCUMENTS

| | | | |
|---|---|---|---|
| 3,631,722 | 1/1972 | Steacie | 73/386 |
| 4,031,386 | 6/1977 | Recker | 377/87 |
| 4,052,597 | 10/1977 | Angus | 377/82 |

Primary Examiner—John S. Heyman
Attorney, Agent, or Firm—Young & Thompson

[57] ABSTRACT

Each drum (5,6,28) of the counter is carried by a shaft (16,26,35) pivoted on the frame (1,2,3,4,11,12) by a bearing (18,19,27,36) which is autolubricating. Each bearing comprises a cylindrical part (52) in synthetic resin presenting a cylindrical median internal surface (53) intended to receive a pivot of the shaft (16,26,35) and two conical surfaces (54,55) widening from the median cylindrical surface (53) toward the frontal surfaces of this part (52).

4 Claims, 6 Drawing Figures

MECHANICAL COUNTER HAVING A DIGITAL DISPLAY

The present invention has for its object a mechanical counter having a digital display for the instrumentation in particular for the instrumentation of an airplane cockpit. These counters are more particularly used as altimetric and barometric mechanical counters having high accuracy for civil and military aviation.

For security reasons, as the electronic counters can fail during an interruption of their supply of electric energy, it is required on civil and military air-craft in particular to provide mechanical counters, in particular altimetric counters, which are directly driven by a barometer or by a mechanical measuring apparatus of the barometric or altimetric pressure.

The tendency to have more and more miniaturization necessitates mechanical counters of lower driving torque and smaller dimensions.

For these very particular applications, it is necessary to reduce the driving torque of the movable parts as much as possible, in order to ensure good operation in a temperature range from −60° C. to +80° C., that the operating characteristics be independent of the relative humidity of the ambiance in which the device is used.

The present invention has for its object such a mechanical counter having a very low torque, which is miniaturized.

The attached drawings show schematically and by way of example one embodiment of the altimetric mechanical counter according to the invention.

Figure 1:
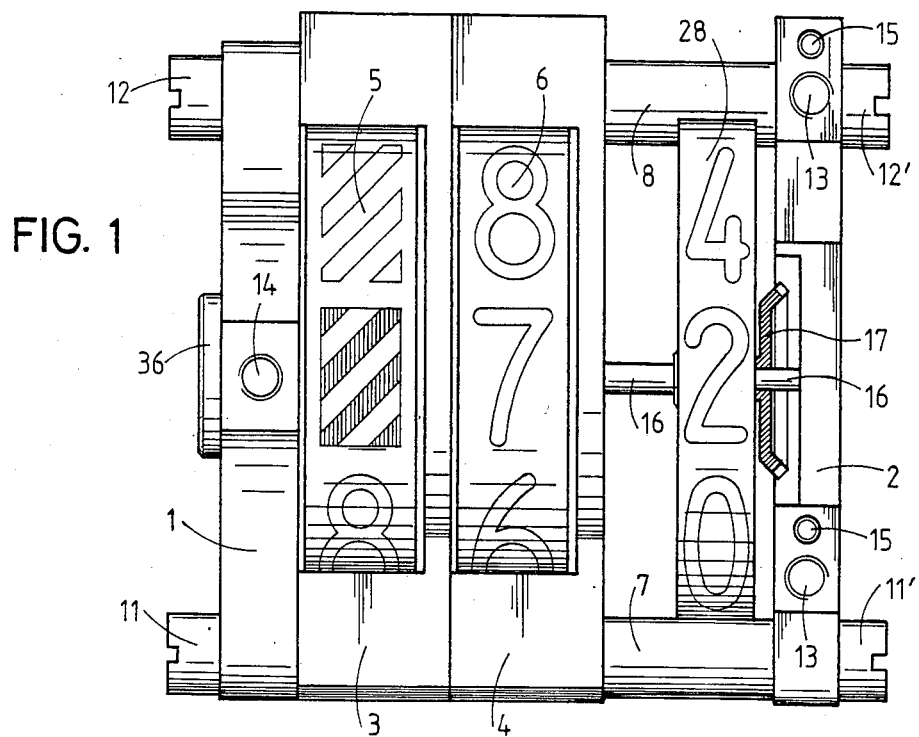
FIG. 1 is an elevation view from the side of the counter according to the invention.
Figure 2:
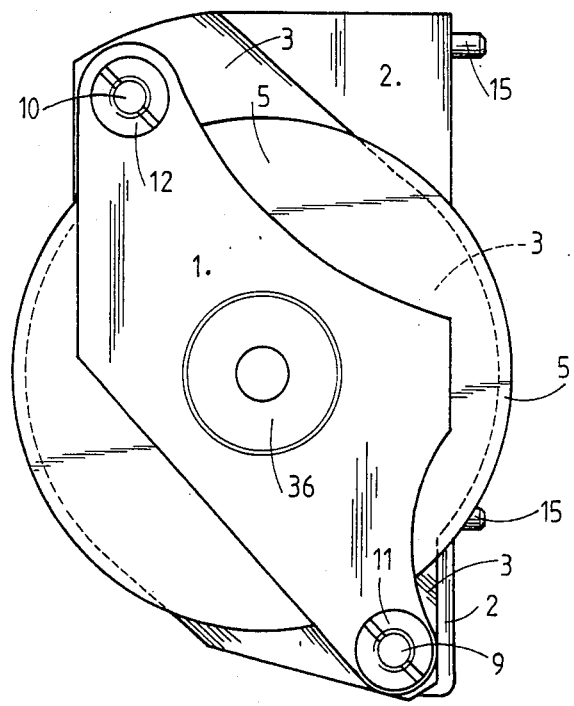
FIG. 2 is an end view of the counter shown in FIG. 1.

The counter shown comprises a frame constituted of moulded end parts 1, 2; of intermediate moulded parts 3, 4 provided with apertures through which appears a portion of the outside cylindrical surface of a ten thousand feet drum 5 and of a thousand feet drum 6 respectively; tubular distancers 7, 8, these parts being assembled the one against the other and tightened together by two threaded rods 9, 10 passing through holes provided in these parts and cooperating with tightening means 11, 11' and 12, 12'. The end parts 1, 2 comprise fixed members constituted by threadings 13, 14 and the end piece 2 comprises positioning members 15 constituted by pins permitting fixing the counter on a control panel.

Figure 3:
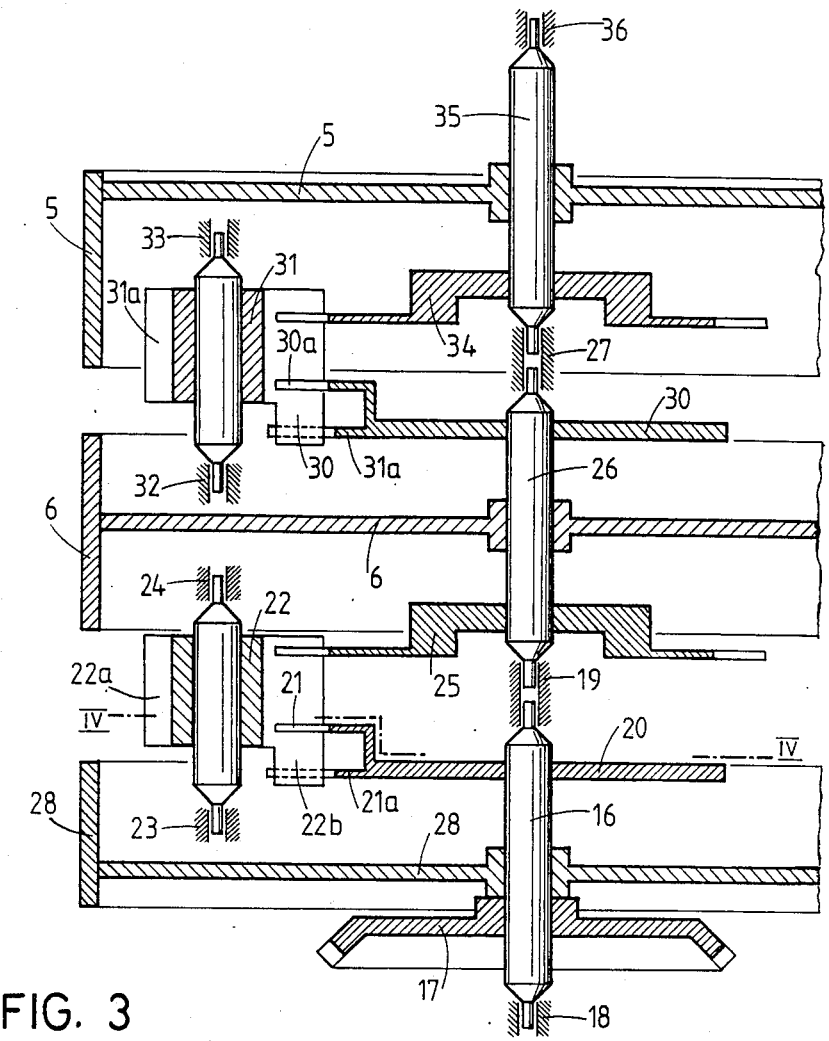
FIG. 3 is a schematic view in cross section of the driving system of three numbered drums of the counter shown in FIGS. 1 and 2.
Figure 4:
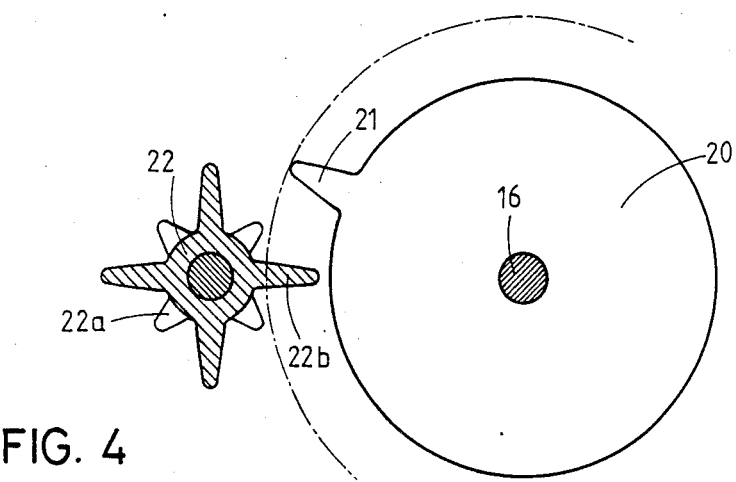
FIG. 4 is a cross section along line IV—IV of FIG. 3.

The mechanism of the miniaturized mechanical counter, the diameter of the drums of which is comprised between 10 and 30 mm and preferably equal to 13 mm, 19 mm or 25.4 mm, and shown schematically in FIG. 3 comprises an input shaft 16 carrying an input wheel 17 for driving the counter through a mechanical altimetric or barometric pressure measuring device causing a rotation proportional to the amount of the variations of the said pressure of an output pinion (not shown) in mesh with the input driving wheel 17.

The shaft 16 is pivoted in bearings fixed, the one 18 in the end part 2, and the other 19 in the intermediate part 4. This shaft 16 carries an indexing plate 20 comprising on its periphery one tooth 21 cooperating with the teeth of a pinion 22 pivoted by means of bearings 23, 24, carried by the intermediate part 4. This shaft 16 carries also the hundred feet drum 28.

This pinion 22 is also in mesh with a first toothed wheel 25 carried by a shaft 26, coaxial to the shaft 16, and pivoted in bearing 19 and in a bearing 27 fixed in the intermediate part 3, carrying the drum of the thousand feet 6 effectuating one complete revolution for ten turns of the hundred feet drum 28.

This shaft 26 carries also an indexing plate 30 having a tooth 30a on its periphery cooperating with the teeth of a second pinion 31 pivoted in bearings 32, 33 fixed in the intermediate part 3 and the teeth of which drive a toothed wheel 34 fast with a shaft 35 carrying the ten thousand feet drum 5. This shaft 35 is pivoted on the one hand in the bearing 27 and on the other hand in a bearing 36 fixed on the end part 1. The demultiplication or division ratio between the shaft 26 and the shaft 35 is also one to ten so that this shaft 35 turns ten times slower than the shaft 26.

This assembly and this very particular disposition permits greatly reducing the dimensions of the counter and satisfying the miniaturization requirment now existing, the outside dimensions being less than 25 mm by 27 mm for example. It is to be noted that practically the entire driving mechanism of the drums is located within said drums.

The hundred feet drum 28 comprises uniformly distributed over its periphery numbers from 0 to 9, as also the thousand feet drum 6, whereas the drum for ten thousend feet comprises the numbers from 1 to 8 and two hatched zones replacing the numbers 0 and 9.

The design and the disposition of this driving mechanism of the drums 28, 6 and 5 of the counter enables its miniaturization, which is the first objective of the applicant; the second objective, the reduction of the driving torque of the counter is achieved by the use of very special bearings for this mechanism.

As a matter of fact, it was necessary to develop new bearings since the bearings now used in this type of application present generally contact surfaces which are graphited so that during their storing and before their assembly in the instruments and apparatus in question and during this assembly particular precautions have to be taken to prevent dust from sticking on the sliding surfaces and thus altering the working conditions. Furthermore, the graphite is sensitive to the humidity so that the characteristics, and particularly the driving torque of the apparatus thus equiped changes as a function of the ambient humidity.

Figure 5:
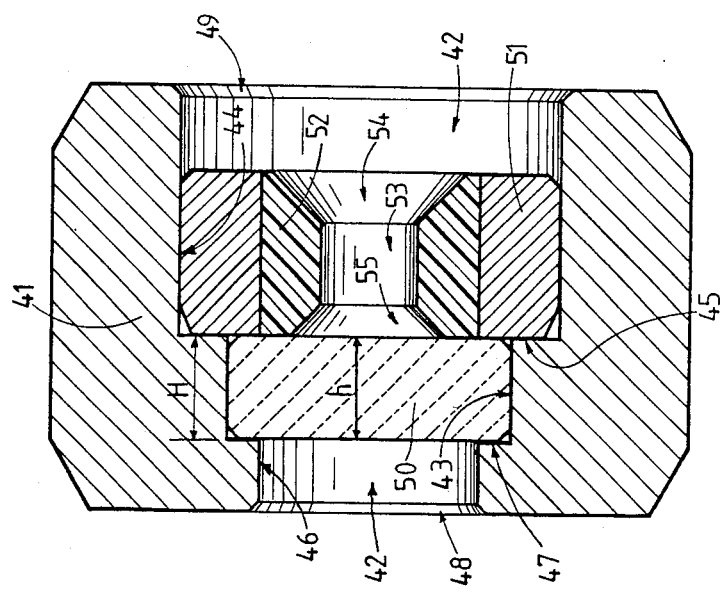
FIG. 5 shows in cross section a bearing used in a driving mechanism of the numbered drums.

The bearings 18, 23, 24, 32, 33 and 36 of the driving mechanism of the drums of the counter are constituted by an autolubricating bearing shown on a greatly enlarged scale in FIG. 5 which has in actual size an external diameter of about 1 to 3 mm and a thickness of about 0.6 to 1.8 mm, that to say that these bearings are of very small dimensions.

This bearing is not sensitive to aging, to humidity, to temperature variations in a range from −60° C. to +80° C. and does not need any maintenance, lubrication, cleaning or the like.

To obtain such a result the material used for the different parts of the bearing is naturally important, but it is also necessary to provide a combination of parts and to determine the shape of each of these parts so that the characteristics of the resulting bearing will be optimal.

The bearing shown at in FIG. 5 comprises a body 41 having a generally cylindrical shape, the edges of which have been chamfered to facilitate its assembly in a apparatus or instrument which is generally made by insertion in a calibrated hole.

This body 41 has a central through passage 42, presenting a first cylindrical surface 43 and a second cylindrical surface 44 having a greater diameter defining thus a shoulder 45. A third cylindrical surface 46 of smaller diameter than the first one 43 defines a second shoulder 47. The ends of the central passage merging on the frontal faces of the body 41 are chamfered at 48 and 49 respectively.

A disc of ruby 50, synthetic or natural, has a diameter corresponding to that of the first cyindrical surface 43 in order to be fixed into the body 41 by driving or by friction into said cylindrical surface 43. The height h of this disc 50 is equal to the height H of the said cylindrical surface 43 so that when the ruby disc 50 is in service position, abutting against the shoulder 47, its other face will be located in the plane of the shoulder 45. The circular edges of the disc 50 are chamfered to facilitate its introduction into the body 41.

It is evident that this disc of ruby 50 could be alternatively be of other synthetic or natural stones generally used for industrial bearings.

This disc 50 of hard stone is maintained in service position as shown by a steel ring 51 driven, fitted or fixed in the second cylindrical surface 44 of the body 41, which rests against the shoulder 45 and which thus enters in contact with the frontal face of the disc 50. The circular internal edges of this ring 51 are chamfered to facilitate its introduction into the body 41.

This steel ring 51 houses a part 52 made of a synthetical resin denominated "Hostaforme", made by the firm HOEGST AKTIENGESELLSCHAFT, FRANKFURT A/MAIN-HÖGST, with which it is fastened by any means, such as setting, driving in, gluing etc. The thickness of this part 52 is equal to that of the ring, it presents a central hole 53 of a diameter corresponding to that of a pivot that cooperates with this bearing. This hole 53 is extended on either end by conical surfaces 54, 55 widening towards the frontal faces of the part 52.

This synthetic resin "Hostaforme" is autolubricating and do not require any graphite or any other external lubrication.

Tests made with these bearings have proven that they are of a very simple assembly, do not necessitate any lubricating operation, that they need no maintenance, that they correspond to the working conditions required and enumerated above and that the driving torque is reduced by about 50% with respect to a normal bearing and that on top of all this, the driving torque diminishes after a certain time of utilization without introducing any play or other negative consequences. This bearing has thus mechanical characteristics which improve as a in function of its duration of use.

Figure 6:
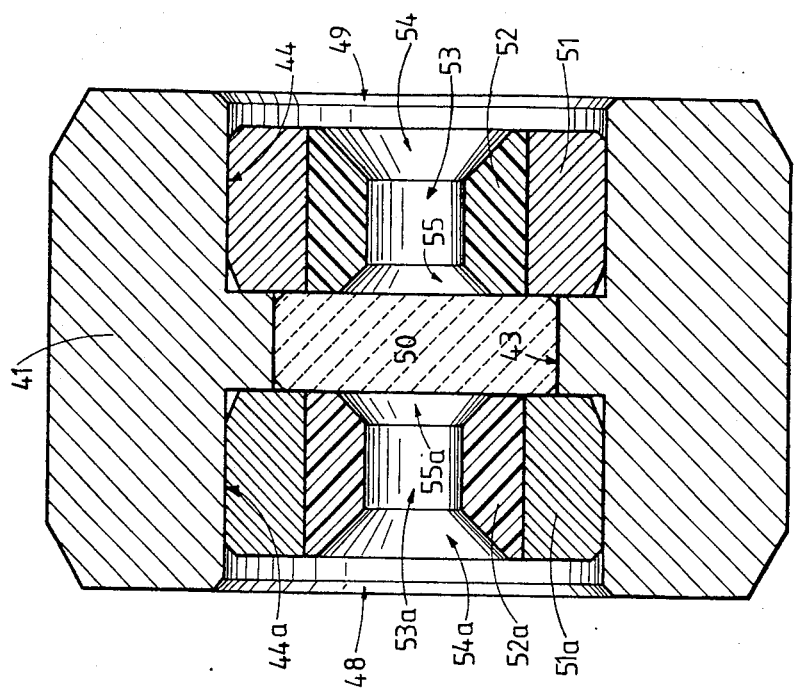
FIG. 6 shows in cross section a bearing used in the driving mechanism of the numbered drums of the counter.

The bearings 19 and 27 of the driving mechanism of the drums of the counter are those constituted by a double bearing shown in FIG. 6 which differs from the one shown in FIG. 5 in that the shoulder 47 against which the disc 50 rests is replaced by a second ring 51a driven into a cylindrical surface 44a which the body 41a presents and housing a part 52a. Thus, the same disc of hard stone 50 is used as an abutment for the inline bearings cooperating with two distinct coaxial pivots. The other elements of this bearing are the same as those described with reference to FIG. 5.

Practical tests have shown that in two and three inch counters having three drums the driving torque as well the static torque, thanks to these new bearings, is reduced by at least 40% with respect to the existing counters.

It is evident that in other forms of the driving mechanism of the drums, it could comprise locking means of these drums in their angular position when they are not driven, but for the first drum 28 of the hundred feet, which is continuously driven and mechanically coupled to the barometric motor systems.

Thus, the pinions 22 and 31 can comprise, as shown, alternatively normal teeth 22a, 31a and elongated teeth 22b, 31b. The elongated teeth 22b and 31b are intended to cooperate with teeth 21a, 30b respectively, carried by the indexing plates 20, 30 which are such that they do not cause the driving of the pinions 22, 31 when they are driven in rotation, but instead lock the pinions in their angular position when the indexing plates are either standing still or in rotation, in which condition the conical teeth 21, 30a do not drive the pinions 22, 31.

In a non illustrated variant, the drum 28 of the hundred feet could be disposed immediately beneath the drum 6 of the thousand feet reducing thus further the length of the counter. In such a realization, this drum of the hundred feet could also be located within an intermediate part as the two other drums which would replace the distancers 7, 8. The drum for the hundred feet can be wider and may comprise indications of hundred of feet, 100, 200 . . . 900. The number of drums can be different and depends on what has to be displayed. Furthermore the demultiplication ratio of the driving mechanism of the drums can be different and depend on the metric or other system which is used.

Finally, the different parts of the frame of the mechanism as well as the drums can be of metal or plastic material.

Thanks to its new design, the mechanical counter particularly the altimetric or barometric counter according to the indications carried by the drums, has the following main advantages:

a. It has a very reduced size which permits integrating it easily in for example the control panel of an aircraft.

b. Its driving torque is reduced by at least 40% with respect to the existing counters. In this way, the barometric motor driving it can have a lower motor torque and thus be of reduced dimensions.

c. The use of new bearings avoids any intervention before a assembly, and permits a storage of very long duration without inconvenience or loss of performance of the counters.

d. The performances of the counters do not decrease with time on the contrary the resisting torque of the bearing diminishes as a function of its utilization.

e. The counters thus designed are particularly reliable and perform well and can be used over a wide range of ambient temperatures.

I claim:

1. Digital mechanical counter comprising a plurality of coaxial rotative display drums pivoted on a frame, said drums being linked by gear means producing a predetermined ratio between the number of turns of each drum with respect to the others, said frame comprising two end parts and a plurality of intermediate parts each housing one of said drums and having a peripheral aperture through which a portion of the corresponding drum can be seen; autolubricating bearings carried by said intermediate parts for pivotally mounting the drums, and pinions meshing with gear wheels fast with neighboring drums; said end parts and said intermediate parts being applied against each other by means of at least two tightening means at each of said end parts and passing through corresponding openings provided in all said parts.

2. Digital mechanical counter as claimed in claim 1, in which the frame comprises further distancers located around the tightening means and between an intermediate part and an end part.

3. Digital mechanical counter as claimed in claim 1, in which said gear means are part of a driving mechanism of the drums and in which the entire driving mechanism is located within a cylindrical surface of a diameter less than and concentric with the outside diameter of the drums.

4. Digital mechanical counter as claimed in claim 3, in which all said drums and all said pinions are pivoted in bearings comprising a metallic body provided with a central through passage having a cylindrical surface in which a disc forming an abutment for a pivot is positioned; a cylindrical part of autolubricating synthetic resin fixed in the body, this part having an internal medial cylindrical surface adapted to receive a pivot and two surfaces widening from said medial cylindrical surface toward the frontal surfaces of this part, the frontal internal face of the part of synthetic resin being in contact with the face of the disc.

* * * * *